United States Patent [19]
Thomas

[11] Patent Number: 6,116,630
[45] Date of Patent: Sep. 12, 2000

[54] ALL TERRAIN VEHICLE FOOT REST

[76] Inventor: Kenneth Eugene Thomas, 3737 W. Calavar, Phoenix, Ariz. 85023

[21] Appl. No.: 09/244,477

[22] Filed: Feb. 4, 1999

[51] Int. Cl.$^7$ .............................. B62D 25/20; B62J 25/00
[52] U.S. Cl. ........................... 280/291; 180/90.6; 296/75
[58] Field of Search .................................... 280/291, 163, 280/748, 288.4, 164.1, 164.2; 296/75; 180/90.6

[56] References Cited

U.S. PATENT DOCUMENTS

| | | | |
|---|---|---|---|
| 4,458,910 | 7/1984 | Stillwagon | 280/291 |
| 4,728,121 | 3/1988 | Graves | 280/748 |
| 4,768,799 | 9/1988 | Millican | 280/291 |
| 4,852,900 | 8/1989 | Nahachewski | 280/291 |
| 5,513,868 | 5/1996 | Barr | 280/400 |
| 6,016,943 | 1/2000 | Johnson et al. | 224/401 |
| 6,017,045 | 1/2000 | Dermody | 280/169 |

FOREIGN PATENT DOCUMENTS

0164681  6/1990  Japan ....................... 296/75

*Primary Examiner*—Brian L. Johnson
*Assistant Examiner*—Avraham H. Lerner
*Attorney, Agent, or Firm*—Patent & Trademark Services; Thomas Zack; Joseph H. McGlynn

[57] ABSTRACT

A pair of foot rest and guard members that can be retrofitted on opposite sides of a three or four wheeled vehicle, such as an ATV or all terrain vehicle. Each foot rest and guard is the mirror image of the other and has an enclosing outer rigid lightweight frame structure made up of an inner frame member and an outer frame member which members are joined together by a third side frame member. Each of the rigid frame structures may be directly bolted to the ATV or may have a frame extension joined to its outer frame member that engages a like frame extension member of the other foot rest and guard. Within the enclosing opened frame structure of each foot rest and guard is an inner generally U-shaped foot rest frame member which is fixed to its outer frame member at its bight portion. Two lower intersecting safety net members mounted tautly on the frame structure extend below the U-shaped foot rest frame members and act to provide a supporting safety surface if a user's foot were to slip or fall from the frame structure. Both the foot rest and guards can be mounted to the vehicle by either side bolts or using the extensions with looped clamps to engage the existing frame components depending on the existing shapes, sizes and configuration of the specific preexisting frame elements of the vehicle on which they are to be mounted.

7 Claims, 7 Drawing Sheets

ALL TERRAIN VEHICLE FOOT REST

BACKGROUND OF THE INVENTION

All terrain vehicles (ATVs) have been used for many years to allow their users to ride in the great outdoors especially in places having either no roads and rough terrain. As such, the rider may experience whatever the prevailing terrain offers and be subject to whatever the weather offers. Experiencing uneven terrain, wet ground conditions, heat and cold are just part of what one can expect when riding a ATV.

Whether the ATV has three wheels or four (QUAD) wheels, the rider is limited in the space available to place their depending feet when driving. Typically, this limited space consists of foot mount members, e.g.,the pedals or foot rests, protruding from the opposite lower sides of the ATV placed their by the manufacturer. Many foot mounts are rather small and shaped like cylindrically shaped rods with one end mounted to the ATV. As such, one or both of the user's feet can easily slip off these side foot mount members as the ATV experiences up/down and sideways movement on and over the underlying terrain. Moisture on the road and ATV only increase the probably that foot slippage will occur.

If two riders mount the same ATV, a practice usually discouraged, the rear mounted rider may have no foot rest at all giving them the choice of either extending their dangling feet away from the ATV or they may place them dangerously near the spinning rear wheel(s). Both positions of the second riders feet provide excellent opportunities for severe leg injuries.

In any event, experience clearly demonstrates there is a need for more foot space for the single rider and any passenger to rest their feet as the ATV, moves up or down, moves to either side or changes its velocity in a short time frame. Such an added foot rest must not only be durable enough to support the weight of each of the user's feet but also their total body weight should the rider stand on it while traversing over rough terrain. This added foot rest must also have a degree of flexibility to take into consideration any movement of the foot-peg (or foot pedal) and have sufficient surface area to accommodate the feet of the rider and any passenger.

These and other desirable characteristics are all incorporated into the present invention wherein two side foot rests for an ATV are disclosed that can be mounted to an existing ATV without using welding or bonding materials to attach the same to the ATV.

DESCRIPTION OF THE PRIOR ART

Devices that engage the feet of riders on ATV or motorcycles are known. For example, in the Stillwagon invention (U.S. Pat. No. 4,458,910) a foot retainer for a motorcycle passenger is disclosed having a support roller pivotally attached to the motorcycles frame with a guide roller rotatably carried on the support roller.

The Graves patent (U.S. Pat. No. 4,728,121) discloses a foot protector apparatus for a multi-wheeled recreational vehicle to prevent contact of the operator's feet or legs with the rear wheels of the vehicle. A grill assembly is mounted on both sides of the vehicle at foot height and is fastened to the existing structural component of the vehicle, like its crankcase housing, by bolts within a support bracket.

In U.S. Pat. No. 4,768,799 to Millican the motorcycle foot guard has a frame with a flat horizontal plate attached to the frame. A vertical member extending upwardly from the rear edge of the plate prevents the rider's foot from moving off the plate towards the rear wheel. A flange is used with nuts and bolts to attach the foot guard to the body of the motorcycle.

And in the Nahachewski reference (U.S. Pat. No. 4,852,900) a foot guard frame for an ATV is disclosed having a connector for connecting the frame to the vehicle. The connector includes a pair of bolts 60 to connect the device 20 to the vehicle 10.

The present invention relates to two foot rests and guards each having a lightweight and durable outer support perimeter frame, an inner foot rest frame attached to outer frame and several netting members extending across the outer frame and attached the frame's sides. Each of the two foot rests and guards are interconnected by an extending frame mounting member that spans the width of the vehicle on which mounted and bears against its existing frame structure, without the use of welds or bolts, to mount the foot rests and guards on sides of the vehicle all as more fully set forth in this specification.

SUMMARY OF THE INVENTION

This invention relates to two foot rests and guards for a motor driven vehicle such as an all terrain vehicle or a motorcycle. Each foot rest has an outer support perimeter frame with an inner foot rest frame attached to outer frame and several netting members extending across the outer frame. Interconnected the foot rests is an extending frame mounting member used to mount and frame members to the vehicle's existing frame structure without the use of welds or bolts.

It is the primary object of the present invention to provide for an improved foot rest and foot guard for use with an all terrain vehicle.

Another object is to provide for such a foot rest and guard that can be mounted on the vehicle, whether it has three or four ground engaging wheels, without the use of fasteners such as bolts, welds or bonding materials.

These and other objects and advantages of the present invention will become apparent to readers from a consideration of the ensuing description and the accompanying drawings.

DESCRIPTION OF THE PREFERRED EMBODIMENT

Figure 1A:
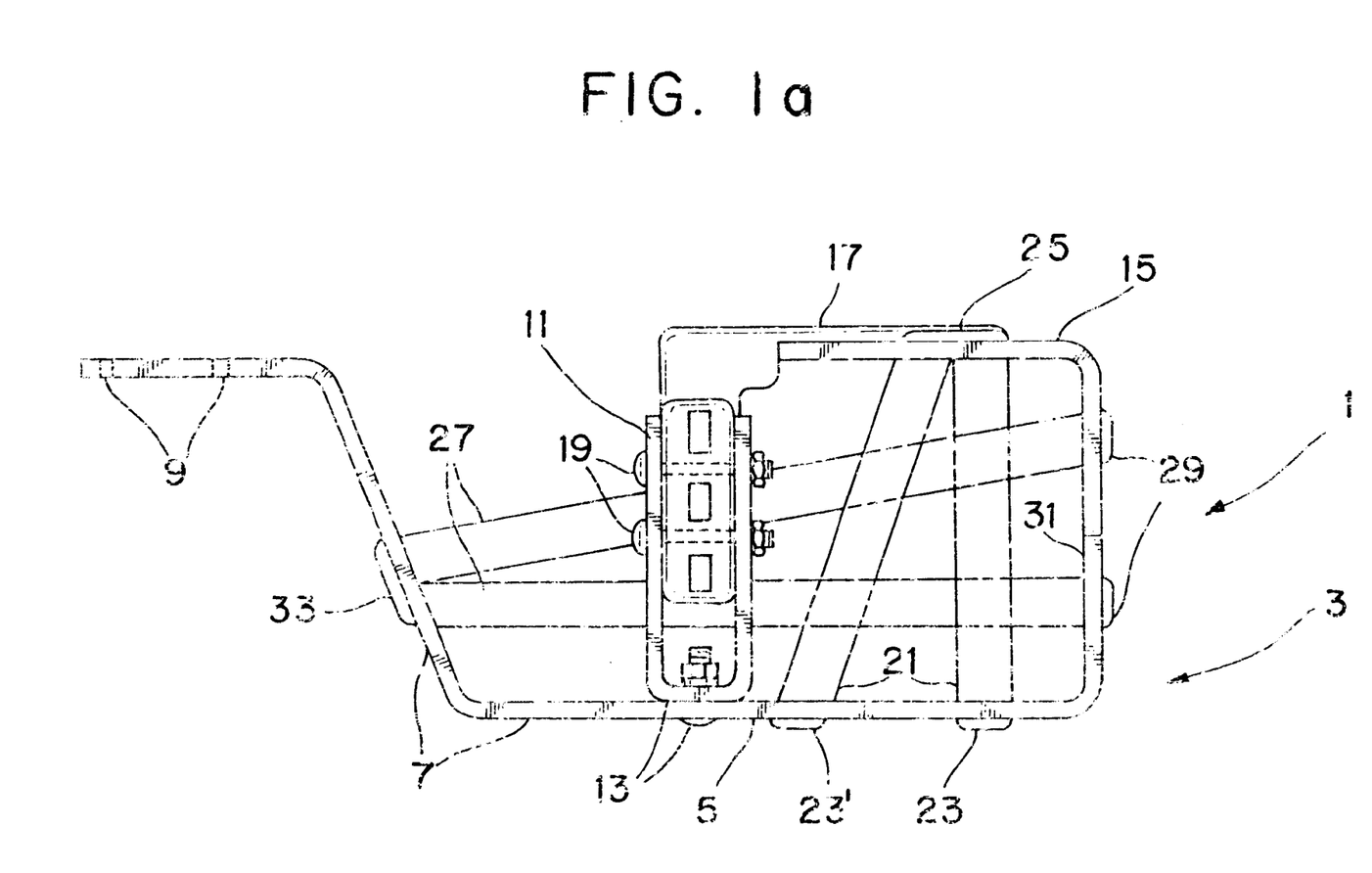
FIGS. 1(a)–(b) are top views of three different preferred embodiments of the foot rest and guard that can either be used with a three wheeled vehicle FIG. 1(a), a four wheeled vehicle FIG. 1(b) or a universal ATV vehicle FIG. 1(c).
Figure 1B:
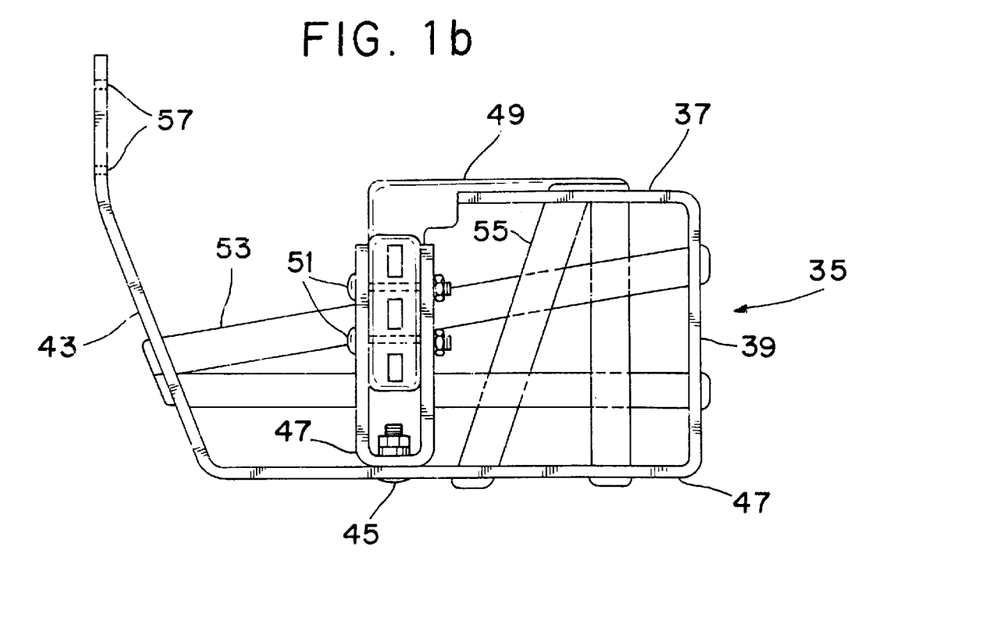
Figure 1C:
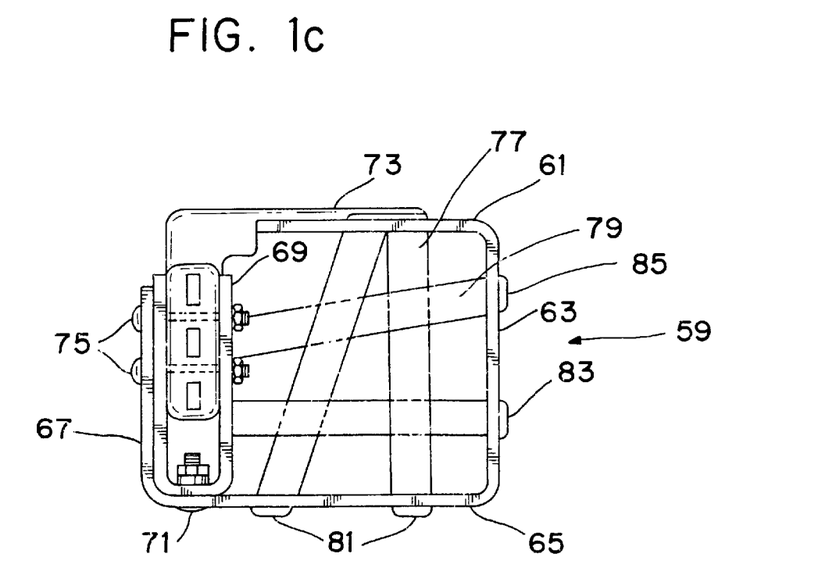

FIGS. 1(a)–1(c) are top views of three different preferred embodiments of the foot rest and guard that can either be used with a three wheeled vehicle FIG. 1(*a*), a four wheeled vehicle FIG. 1(*b*) or a universally on a vehicle FIG. 1(*c*). In FIG. 1(*a*), the foot rest and guard 1 is specifically designed to be used on an all terrain vehicle having three wheels, two wheels in the rear and one wheel in the front. Two of these foot rest and guards are normally used on a ATV with one located on each opposite side. An outer perimeter lightweight metallic frame 3 made of a moisture resistant and durable material, like aluminum, defines the added surface area formed by the foot rest and guard. Integral with the lateral front side perimeter member 5, and forming part of the frame 3, is the upwardly and inwardly facing extension member 7 made of the same material as the frame 3. At the terminal free end of member 7 are two through holes 9 that receives bolts that are used to hold a mirror image version of the foot rest and guard shown in FIG. 1. This version is located on the opposite side of the ATV and has holes that correspond to the holes 9 in its like member extension member 7. By placing bolts with nuts on their ends through the holes 9 in the two opposite foot rests and guards, the two opposite side members can be bolted together with the ATV between them.

Extending inwardly towards the vehicle from the lateral frame member 5, is a U-shaped inner frame member 11 that is bolted to this side frame member by a round head bolt and mating end nut designated collectively by the number 13. A through hole in the bight portion of the member 11 is aligned with a through hole in outer member 5, to permit the insertion of the bolt in combination 13. At the inner frame member 15 located closer to the ATV and parallel to outer frame member 5 and integrally forming part of the frame 3, is a retained peg 17 sometimes called a foot-peg, foot rest, foot pedal or foot support. This elongated peg 17 overlaps the side of frame member 15 on the ATV side and extends around the right angled corner to where it is joined with the inner U-shaped frame 11 by two separate through bolt and nut combinations 19 that extend through two sets of spaced holes in the member 11.

Extending across the formed opened framed area between the two parallel inner and outer frame members 5 and 15 and below the U-shaped frame member 11 is a nylon web like net member 21. Initially, one of the two opposite free ends of net 21 is inserted into a through hole in the outer frame member 5 and retained therein by one of the knotted ends 23 or by another type of end fastener. There are two holes in inner frame member 15 that are spaced closely together and at approximately the mid or intermediate length 25 of flexible elongated net member 21, and these two holes engage the inserted net. The net's other free end is then pulled through a second spaced hole in member 5 to cause the net to be tensioned and become taut. When so tensioned, the net is tied by a second outside frame end knot 23', like knot 23, that engages the outside surface of frame member 5. Similarly, a second intersecting flexible and elongated nylon net member 27 is also located below the U-shaped member 11 and tensioned to become taut when mounted in the frame structure between the frame extension members 7 and the inwardly extending frame member 31 using knotted net ends 29 that are located on the outside surface of the frame member 31. Two closely spaced through spaced holes in the member 31 permit the ends of net 27 to be inserted through this frame extension. At approximately the mid length 33 of elongated net member 27, similar to the like net member 21, net member 27 also fits through two closely spaced holes in the inwardly bent portion of frame extension 7 to allow for a tensioned or taut lightweight emergency foot support surface. The opened spaces or areas formed by the opened spaces within frame 3 between the two intersecting lower nets 21 and 27 is such that these opened spaces are each smaller that a typical user's foot. The three integrally joined rigid frame members 5,7, 15 and 31 constitute the solid outer metallic enclosing frame structure for the frame 3 of the foot rest and guard.

The structure shown in FIG. 1(*b*) is similar to that shown in FIG. 1(*a*) but has been specifically designed for use with a four wheel or quad ATV. The angle formed by the two facing frame extensions 43, only one of which is shown in this figure, the other being a mirror image thereof) rests on the ATV's frame for support. Thus, when bolts and there engaging holes on the sides of the ATV are not present by the manufacturer, the facing angled extensions 43 may allow for the necessary support on the ATV. Similarly, two facing extensions 7 of FIG. 1(*a*) could be joined together and resting on an existing frame of an ATV should there be no appropriate manufacturer supplied side bolt and bolt holes on the ATV into which the inner frame member 15 can be bolted. Thus, how the foot rest and guard of this invention is mounted to an existing ATV depends whether the initial manufacturer of the ATV has supplied removable side bolts and holes into which the frame can be bolted or, if not, then frame extensions 7 or 43 must be mounted on exist frame of the ATV. Care must be taken not to mount the foot rest and guard of this invention too close to the shifter or brake of the ATV such as to interfere with their functioning. Mounting to an ATV depends on what elements exist as supplied by the particular ATV manufacturer.

In FIG. 1(*b*), there is a rigid integral outside lightweight metallic frame 35 consisting of the four joined frame sections 37, 39,41 and extending frame extension 43. Within the interior of this frame 35 and joined thereto at outer member 41 by a bolt nut combination 45 is the inwardly facing U-shaped foot rest frame member 47. The free end of frame member 37 has a peg structure 49 that extends along its length and then makes a right angled to be joined to inner frame member 47. Appropriate bolt nut combinations 51 retain the end of the peg in a fixed relationship with U-shaped member 47. Two tensioned and taut intersecting nets 53 and 55 each having their inserted free ends joined to the frame members 39 and 41, respectively, at spaced through holes in these members. At approximately their mid lengths the two flexible elongated net members 53 and 55 extend through two closely spaced holes in the frame extension 43 and the inner frame member 37, respectfully. A mirror image of what is shown in FIG. 1(*b*) is placed on the opposite side of the ATV and joined near its extension member 43 end by inserting two bolts/and nuts combinations through the spaced end extension holes 57. This arrange of the lower supporting intersecting nets is essentially the same as that previously described with respect to the FIG. 1(*a*) net structure. The terms inner frame and outer frame members refer to the their relative location with respect to the ATV on which mounted.

The structure shown in FIG. 1(*c*) is similar to that shown in FIGS. 1(*a*) and (*b*) but has been specifically designed for universal use with either a three or four wheel ATV. This embodiment is used where there is no place to mount the frame extensions (7 or 43) to the frame of the existing ATV. Thus, it would mainly be used when neither of the FIGS. 1(*a*) or 1(*b*) embodiments are not used. The inner frame member 61 would be bolted to the lower side of the ATV through existing bolt holes on the ATV or, as a last alternative, brackets (not shown) could be used to interconnect the inner frame member 61 to the ATV. There is an integrally joined outside enclosing frame structure 59 consisting of the four frame sides: the inner member 61, the side joining members 63 and 67, and the outer member 65. Within the opened space of this enclosing frame structure 59 is a U-shaped frame member 69 fixed by the bolt/nut combination 71 at its bight portion to the outside frame member 65. A peg 73 extends along the free end of inside frame member 61 and makes a right angled turn to be joined to the U-shaped inner foot rest member 69 by two bolt nut combinations 75. Extending across the interior of the enclosing frame 59 are two tensioned and taut flexible elongated net members 77 and 79 whose free ends are each fixed by two knot sets (81 and 83) on the outside of the frame members 65 and 63, respectively, like in the two nets in the FIGS. 1(*a*) and (*b*) described embodiments. The lower intersecting nets located below the U-shaped bracket 69 provide safety net surface on which a user's foot can rest should it slip or be placed into the enclosed opened space of the frame 59.

With the construction shown in FIGS. 1(*a*)–(*c*) embodiments, a user could place the bottom of each of their feet with one on each of the two top surfaces of the two inner U-shaped members that are located within the enclosing frames of the two foot rests and guards on either side of the ATV. Normally, the two side foot rests and guards are located just below the two side foot rests pedals provided by the manufacturer on the ATV. Should either user's foot become dislodged from the inner or outer solid frame structure of the retrofitted foot rest frame, the lower taut spanning intersecting safety net members (e.g., nets 21 and 27 in FIG. 1(*a*)) are close enough together and have sufficient strength to prevent the foot from falling through them to the ground. Thus, these lightweight nylon nets provide for an additional emergency or safety foot retaining surface without the weight of the solid metallic frame structure of the described U-shaped inner frame and its enclosing outer frame.

Figure 2:
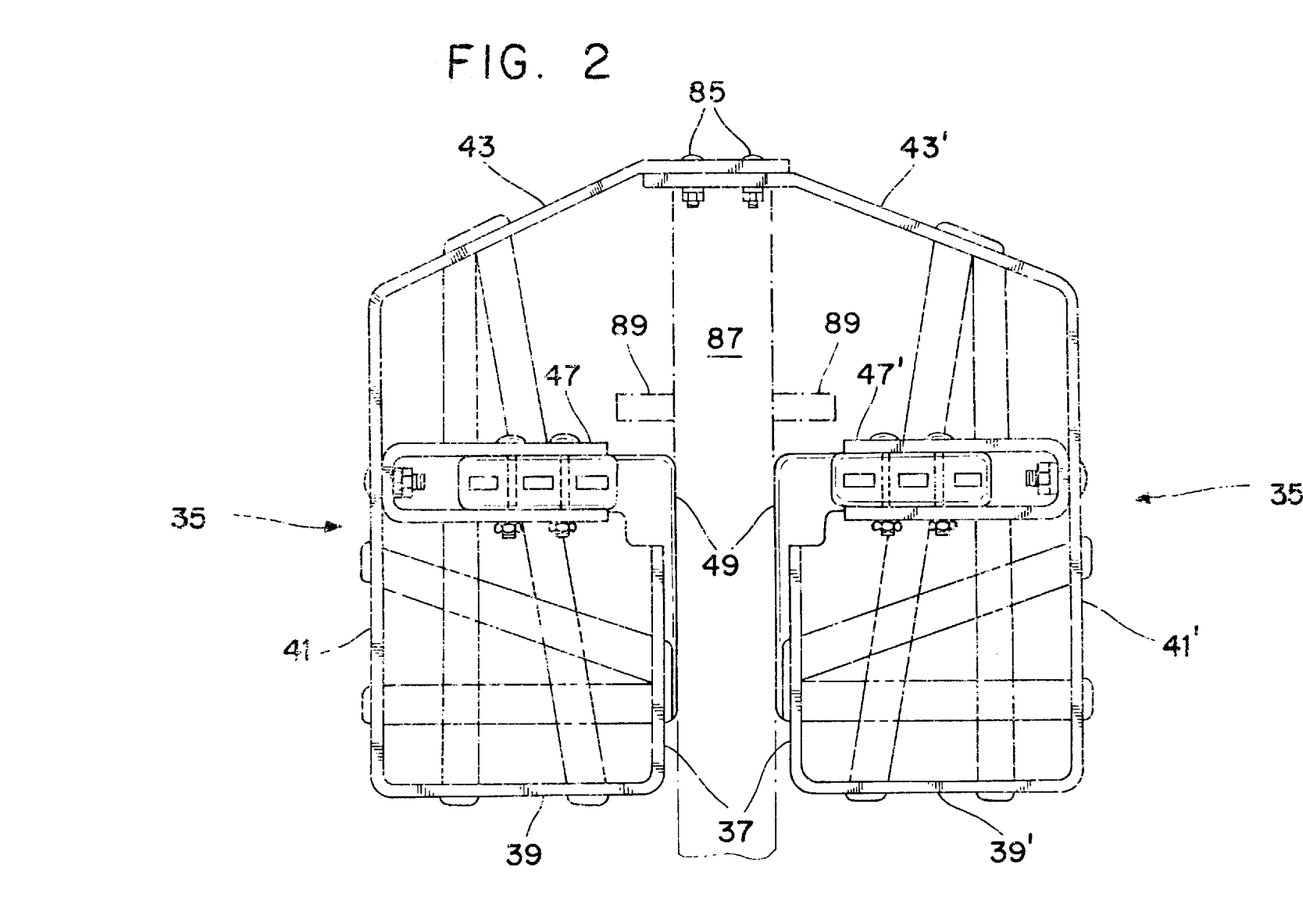
FIG. 2 is a top view of two joined FIG. 1(b) foot rest and guard members.

FIG. 2 is a top view of two joined FIG. 1(*b*) foot rest and guard members. The four spaced holes 57 and 57' in located near the two ends of the two mirror image frame extension members 43 and 43' are joined together by two sets of bolt nuts combinations 85. Each of the two mirror image foot rest and guard members 43 and 43' is located on the lower opposite side of the ATV, shown in dotted line format, and designated generally by the number 87. Usually manufacturer installed foot rest pedals 89 are positioned on each side of the ATV above the two members 43 and 43' and their interconnected frame members 35 and 35'. To do so an additional element is described in FIG. 6. This element prevents the connected members 43 and 43' and their interconnected frame members 35 and 35 from moving up and down with respect to the ATV, as described in more detail with respect to description of FIG. 6. The two facing inner pegs 49 and 49' bear against the opposite sides of the ATV to prevent their lateral shifting with respect to the ATV while the existing frame structure of the ATV bears against the two joined extension members 43 and 43' which prevents them from moving up or down as the ATV moves over rough terrain. Since each of the two foot rests and guards are both durable and lightweight, their outside frame members 41 and 41' provide a protective side barrier for the user's feet that are normally either on the manufacturer's supplied inside pedal rests 89 or on the retrofitted foot rests on the frame extension members 43 and 43'. The two back side frame members 39 and 39' are located nearest the two back wheels of the ATV and similar provide a protective rear barrier for the user's feet.

Figure 3:
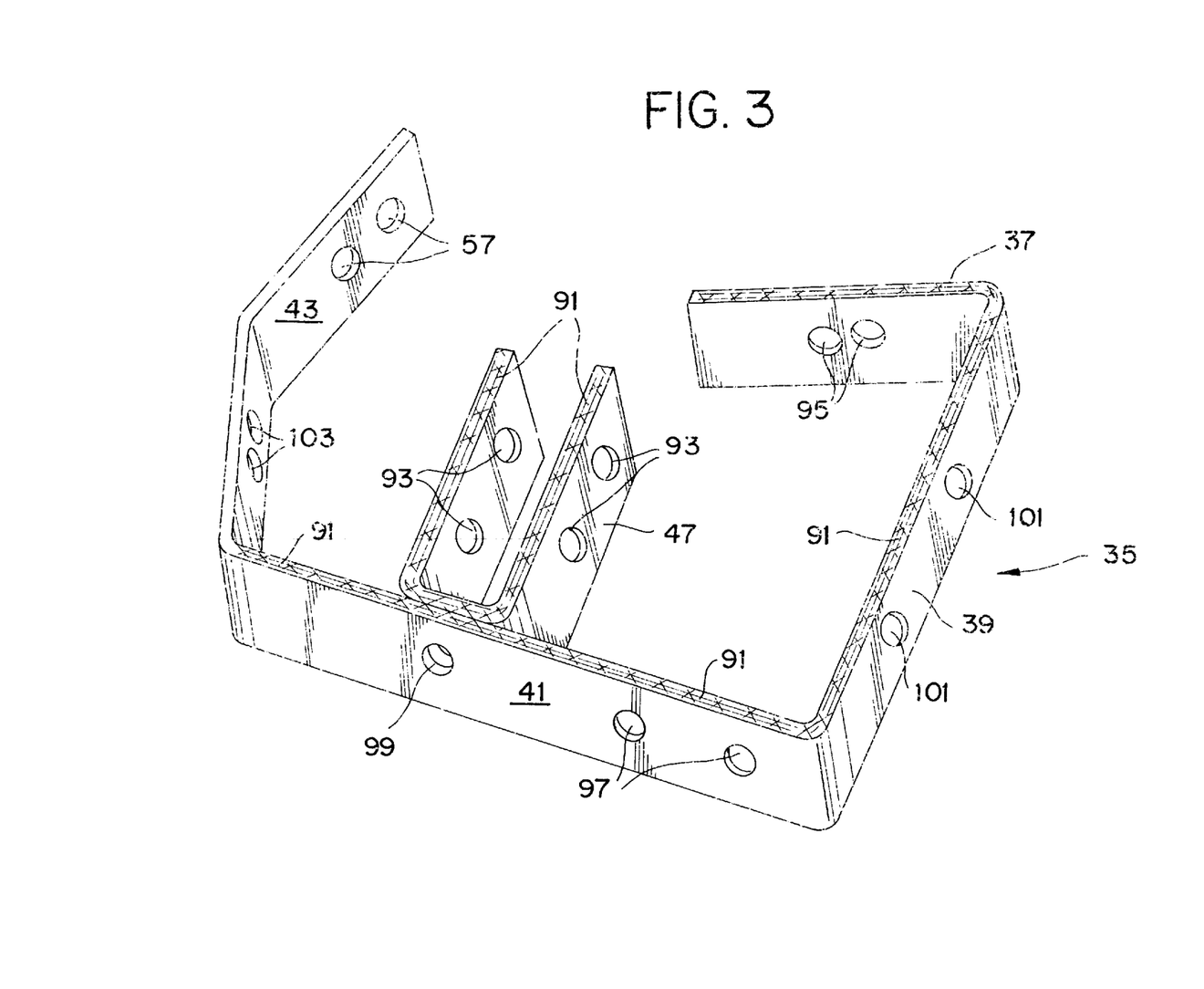
FIG. 3 is a perspective view of the FIG. 1(b) foot rest and guard showing details of the upper knurls surface on which a rider's foot rests.

FIG. 3 is a perspective view of the FIG. 1(*b*) frame for the foot rest and guard showing details of the upper knurls surfaces 91 on which a rider's foot may normally rest. In this figure the bolt and nuts combinations and components for the two taut supporting net surfaces has been omitted for simplicity purposes. The knurls surfaces consists of roughened raised surfaces that extend upwardly a slight distance from the foot engaging tops of the four frame members 37,39,41 and 47. The spaced holes 57 in extension frame member 43 are also depicted in this figure as well as the frame through holes used to mount the two nets to the frame members and the two bolt hole sets 93 used to mount the peg 49 to the U-shaped inner frame member 47. The closely spaced holes 95 are used to wrap the mid length of net 55 whose two opposite ends are knotted through the frame holes 97 in frame member 41. The bolt hole 99 mounts the bolt nut combination 45 and the two sets of holes 101 and 103 are used to mount the ends and mid section of net 53, respectively, as previously described. The other two described frame embodiments of FIGS. 1(*a*) and (*c*) would have a similar arrangement of frame through holes to hold the two intersecting nets, the peg and the U-shaped inner frame members as described previously.

Figure 4:
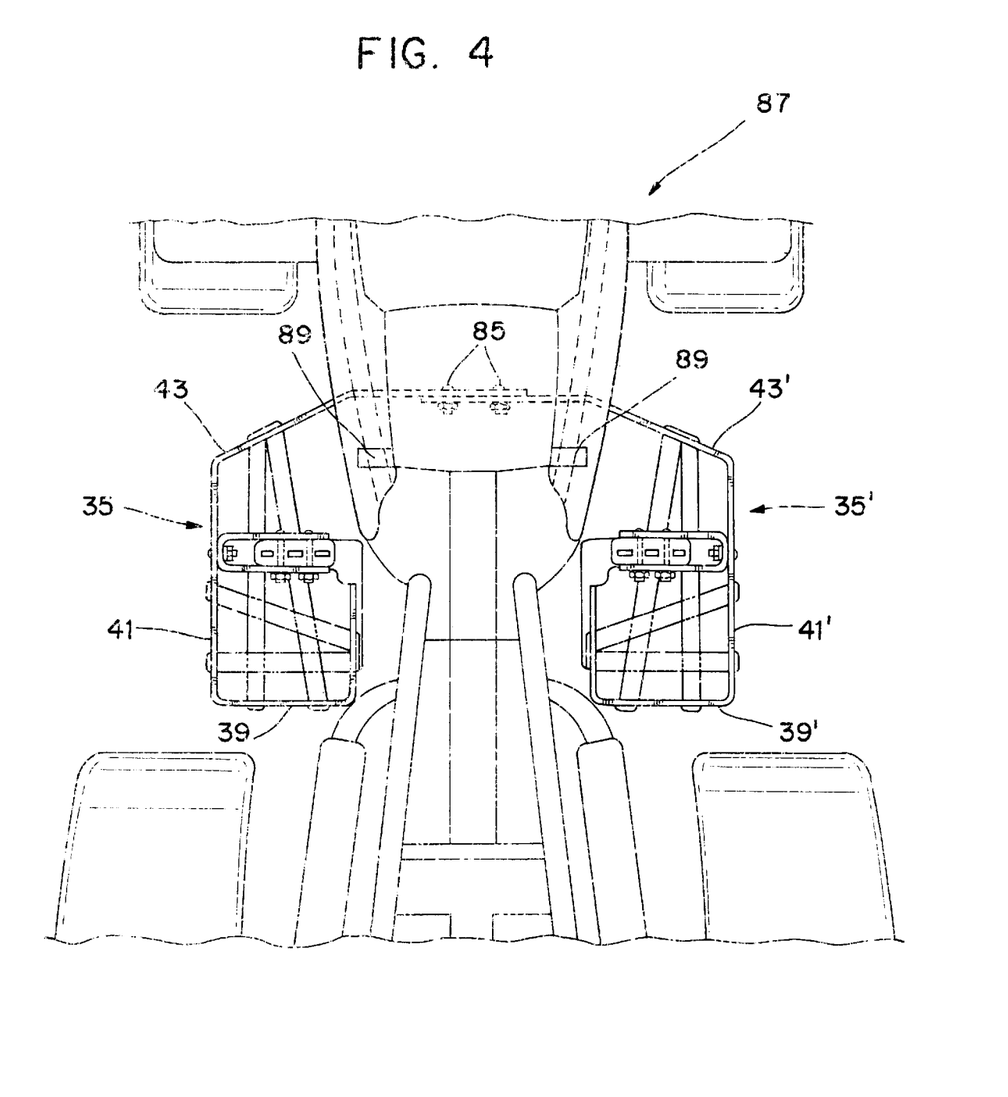
FIG. 4 is a top view of the two of FIG. 1(b) foot rests and guards mounted on the frame of a four wheeled all terrain vehicle.

FIG. 4 is a top view of the two of FIG. 1(*b*) foot rests and guards mounted on the frame of a four wheeled all terrain vehicle 87, partially shown. This figure is similar to the abbreviated version shown in FIG. 2 and better illustrates the side placement of the opposite side mounted two foot rests and guards 35 and 35' with respect to the different components of the existing four wheeled ATV. The two joined frame extensions 43 and 43' have the two bolt and nuts sets 85 (see dotted lines format) mounted under and forward of the two manufacturer supplied side foot pedals 89.

The retrofitted side foot rests and guards of this invention are structurally strong enough that a user may be safety supported on them when riding over rough terrain even as they experience unpredictable surface conditions. Since they their support frames are made of a strong, durable and flexible aluminum material, there is a certain amount of flexibility to the movement of the peg. If there is double riding on the ATV, these retrofitted foot rests and guards provide a larger area for both the rider and passenger to comfortably place their feet without interfering with each other. Further, the two back frame members(e.g., members 39 and 39' in FIGS. 2 and 4) assists in preventing the user's feet from falling into the rear wheels of the ATV and any resulting injury or worse.

Figure 5:
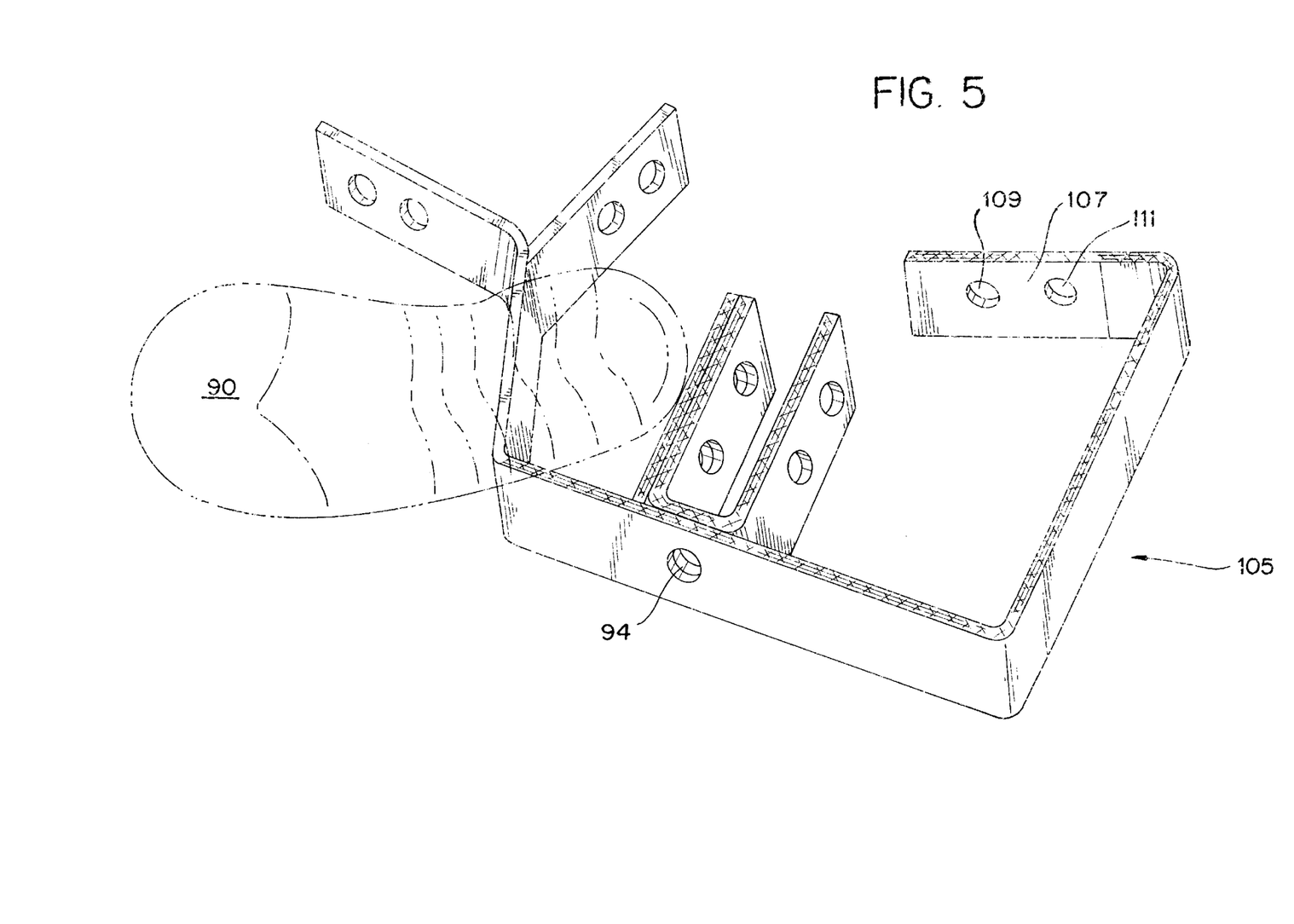
FIG. 5 is a front perspective view of the foot rest and guard showing details of an added shim stock for a schematic three-in-one foot rest and guard.

FIG. 5 is a front perspective view of the foot rest and guard showing details of an added shim stock on a schematic three-in-one unit incorporating the three embodiments of FIGS. 1(*a*)–(*c*). A user's left foot 90 is shown in dotted line format as it would normally rest on the frame's outer extension. The side frame holes (e.g., holes 95,97, 101 and 103 of FIG. 3) for mounting the underlying taut net to the sides of the foot rest and guard have been omitted from this figure to simplify the structure. The three different versions of the foot rest and guard, i.e. those for a three ATV, a four wheel ATV or the universal mount, have thus been schematically combined into this three-in-one unit 105 although manufacturing such a three-in-one unit is not actually contemplated. Added to this schematic three-in-one version foot rest and guard unit is a piece of shim metal stock 107 that has two spaced holes 109 and 111 used to mount the peg bolts to preexisting spaced holes in the ATV where preexisting bolts have been removed. Using this added metallic shim stock is considered better than using washers on the bolt head ends because washers are round and may cut into the soft aluminum metal of the T-bar. This added reinforcing shim stock is usually made of a more dense metal plate than aluminum and extends about ½ of inch past the hole 109. This shim is about 1/16 of an inch thin thick. The actual length of this added shim stock would vary depending on the size of the ATV on which mounted. The purpose of this FIG. 5 schematic drawing is to illustrate that the more stronger and heavier shim stock than the existing aluminum frame stock can be used separately with any of the three different versions illustrated in FIGS. 1(a)–(c).

Figure 6:
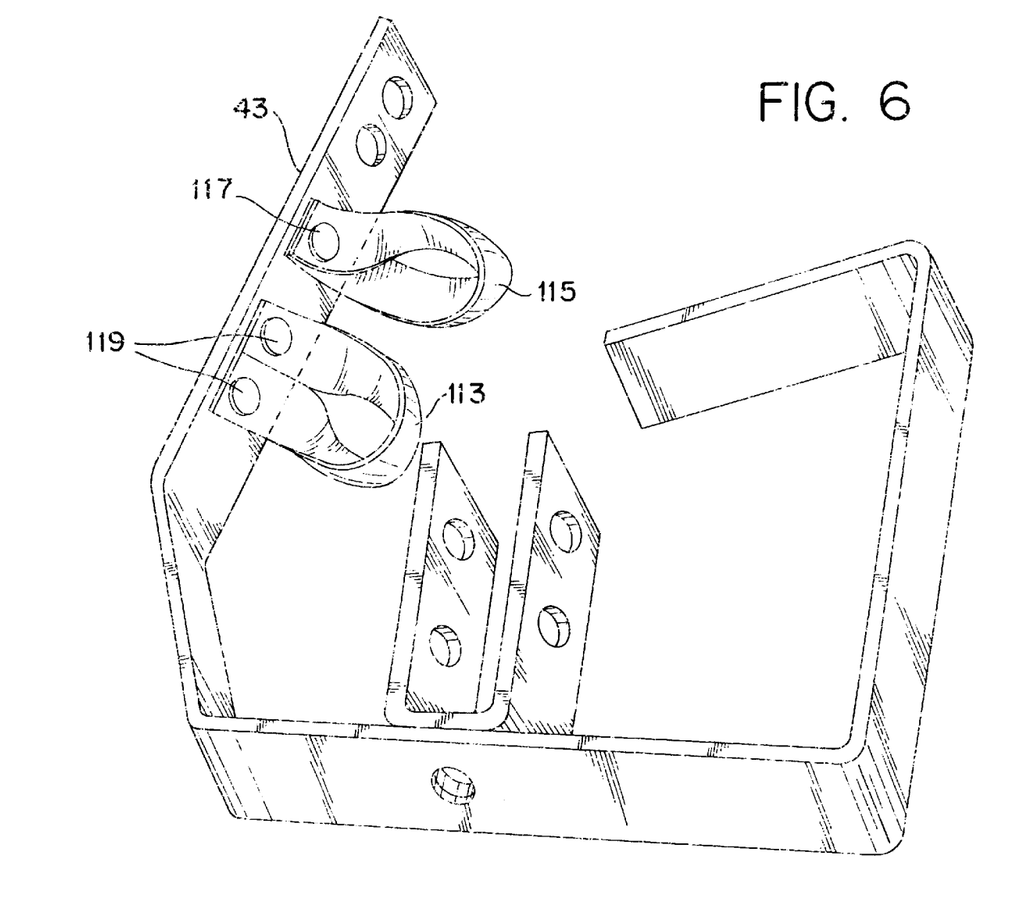
FIG. 6 is a front perspective view of the foot rest and guard showing details of an added clamps used to mount the invention to the existing ATV.

FIG. 6 is a front perspective view of the foot rest and guard showing details of an added clamps used to mount the invention to the existing ATV. In this figure the frame holes used to mount the safety netting as stated with respect to FIG. 3 have been omitted to simplify the explanation. Mounted to the frame extension, for example the extension 43, are two two loop shaped clamps 113 and 115. These loop clamps serve to fasten foot rest and guard to the existing frame structure of the ATV. Each clamp has it end bolted to the extension 43 by one (117) or two bolts (119) that have engaging end nuts(not shown) and extend through holes in the extension. The loop clamps can be customized in overall length to fit around the ATV frame members and placed at the appropriate location on the extension 43 to do so. Normally, the formed loops for each clamp 113 and 115 are a ¼ twisted so that there ends lay flat against the flat surface of the engaged extension. When strapped around an existing ATV frame member these clamps prevent the two opposite side mounted foot rest and guards (see FIGS. 2 and 4) from moving to either side of the ATV and from moving up and down with respect to the ATV. It should be clear that these added loop shaped clamps may not be employed if the foot rests and guards are bolted directly to the sides of the ATV such as with the universal embodiment of FIG. 1(c).

The specific dimensions for the individual components of each retrofitted foot rest and guard can be varied depending on the specific vehicle on which they are to be mounted on. Different materials can also be employed for the individual components other than those described and the colors varied as desired.

Although the preferred embodiment of the present invention and the method of using the same has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A foot rest and guard for a vehicle comprising:
   an enclosing outer rigid frame structure consisting of an inner frame member and an outer frame member joined together by a third side frame member, said inner and outer frame members being generally parallel to each other;
   said rigid frame structure having a frame extension joined to its outer frame member and adapted to extend towards the frame of the vehicle on which the foot rest and guard frame is to be mounted;
   an inner generally U-shaped foot rest frame member mounted to said outer frame member and adapted to extend toward the vehicle on which the foot rest and guard frame is to be mounted; and
   two intersecting tensioned net members mounted tautly on the rigid frame structure, said two net members extending below said U-shaped foot rest frame member to provide a supporting safety net for a user's foot.

2. The foot rest and guard as claimed in claim 1, wherein said outer rigid frame structure having a frame extension has an end with fastener receiving holes adjacent thereto, said fastener holes being adapted to engage like holes on a foot and rest guard located on the opposite side of the vehicle on which they are to be mounted.

3. The foot rest and guard as claimed in claim 2, also including a peg member mounted on said inner frame member and extending to and joined with said U-shaped foot rest frame member.

4. The foot rest and guard as claimed in claim 3, wherein said U-shaped foot rest frame member is mounted generally perpendicular to said outer frame member at a bright portion on the U-shaped member.

5. The foot rest and guard as claimed in claim 4, wherein the top surfaces of said outer rigid frame structure and said inner U-shaped foot rest frame member have roughened foot engaging portions extending along their lengths.

6. The foot rest and guard as claimed in claim 2, also including a plurality of loop shaped clamps fixed to the extension at their ends to loop around frame members of the vehicle.

7. Two foot rest and guard members for a vehicle comprising:
   each of said two foot rest and guard members having an enclosing outer rigid frame structure consisting of an inner frame member and an outer frame member joined together by a third side frame member, said inner and outer frame members being generally parallel to each other;
   each of said outer rigid frame structure having a frame extension joined to its outer frame member and extending towards and joined to the frame extension of the other foot rest and guard, each of said frame extensions adapted to extend towards the vehicle on which the two foot rest and guard frames are to be mounted;
   each of said foot rest and guard members having an inner generally U-shaped foot rest frame member mounted to its outer frame member and adapted to extend toward the vehicle on which its foot rest and guard frame is to be mounted; and
   each of said foot rest and guard members having two intersecting net members mounted tautly on the outer rigid frame structure at their ends, said two net members extending below said U-shaped foot rest frame members to provide a supporting safety net for a user's foot on each foot rest and guard.

* * * * *